(12) United States Patent
Swetish

(10) Patent No.: US 10,206,461 B1
(45) Date of Patent: Feb. 19, 2019

(54) LATCH SYSTEMS AND METHODS FOR STRAPS

(71) Applicant: Kuat Innovations, LLC, Springfield, MO (US)

(72) Inventor: Thomas Ryan Swetish, Bellingham, WA (US)

(73) Assignee: Kuat Innovations LLC, Springfield, MO (US)

( * ) Notice: Subject to any disclaimer, the term of this patent is extended or adjusted under 35 U.S.C. 154(b) by 0 days.

(21) Appl. No.: 15/487,341

(22) Filed: Apr. 13, 2017

(51) Int. Cl.
*A44B 11/25* (2006.01)
*A44B 17/00* (2006.01)
*F16B 1/00* (2006.01)

(52) U.S. Cl.
CPC ........ *A44B 11/2592* (2013.01); *A44B 17/007* (2013.01); *A44B 17/0076* (2013.01); *F16B 1/00* (2013.01); *F16B 2001/0035* (2013.01)

(58) Field of Classification Search
CPC ... A44B 11/2592; Y10T 24/32; Y10T 292/11; A44D 2203/00; A45C 13/1069; H01F 7/0263; A41F 1/002
See application file for complete search history.

(56) References Cited

U.S. PATENT DOCUMENTS

| | | | |
|---|---|---|---|
| 2,615,227 A | 10/1952 | Frederick | |
| 2,648,884 A | 8/1953 | Newton | |
| 6,499,437 B1 * | 12/2002 | Sorensen | A01K 27/005 119/769 |
| 6,505,385 B2 | 1/2003 | Grunberger | |
| 6,622,349 B2 | 9/2003 | Wong | |
| 7,954,211 B2 | 6/2011 | Bien | |
| 9,907,367 B2 * | 3/2018 | Paik | A44B 11/2588 |
| 9,936,772 B2 * | 4/2018 | Paik | A44B 11/2592 |
| 2007/0113383 A1 * | 5/2007 | Grunberger | A45C 13/1069 24/303 |
| 2010/0308605 A1 * | 12/2010 | Fiedler | A45C 13/1069 292/251.5 |
| 2011/0265289 A1 * | 11/2011 | Wu | A45C 13/1069 24/303 |
| 2011/0298227 A1 * | 12/2011 | Fiedler | A45C 13/1069 292/251.5 |
| 2012/0248793 A1 * | 10/2012 | Fiedler | A44B 11/258 292/163 |
| 2014/0277103 A1 * | 9/2014 | Esposito | A44B 11/258 606/203 |

(Continued)

*Primary Examiner* — Robert Sandy
*Assistant Examiner* — Michael S Lee
(74) *Attorney, Agent, or Firm* — Kutak Rock LLP; James H. Jeffries

(57) ABSTRACT

A latch system has a socket assembly and a plug assembly. When the socket assembly is within a predetermined distance from the plug assembly, a socket magnet member and a plug magnet member displace the socket assembly towards the plug assembly. To place the latch system in an engaged configuration, the head portion of the plug member passes through a main opening in a socket housing and a plug opening in a socket plate such that the head portion is within the primary chamber. To place the latch system in a latched configuration, the socket assembly is displaced relative to the plug assembly to arrange at least a portion of the socket plate within a head gap defined by a head portion of a plug member.

18 Claims, 17 Drawing Sheets

(56) References Cited

U.S. PATENT DOCUMENTS

| | | | | |
|---|---|---|---|---|
| 2014/0317890 A1* | 10/2014 | Koons | ............ | A42B 3/08 |
| | | | | 24/303 |
| 2015/0074949 A1* | 3/2015 | Tsai | ............ | A44B 15/00 |
| | | | | 24/3.12 |
| 2015/0135486 A1* | 5/2015 | Fiedler | ......... | A44B 11/2584 |
| | | | | 24/303 |
| 2015/0337879 A1* | 11/2015 | Tucholke | ........ | F16B 1/00 |
| | | | | 24/303 |
| 2017/0172262 A1* | 6/2017 | Paik | ......... | A44B 11/2592 |

* cited by examiner

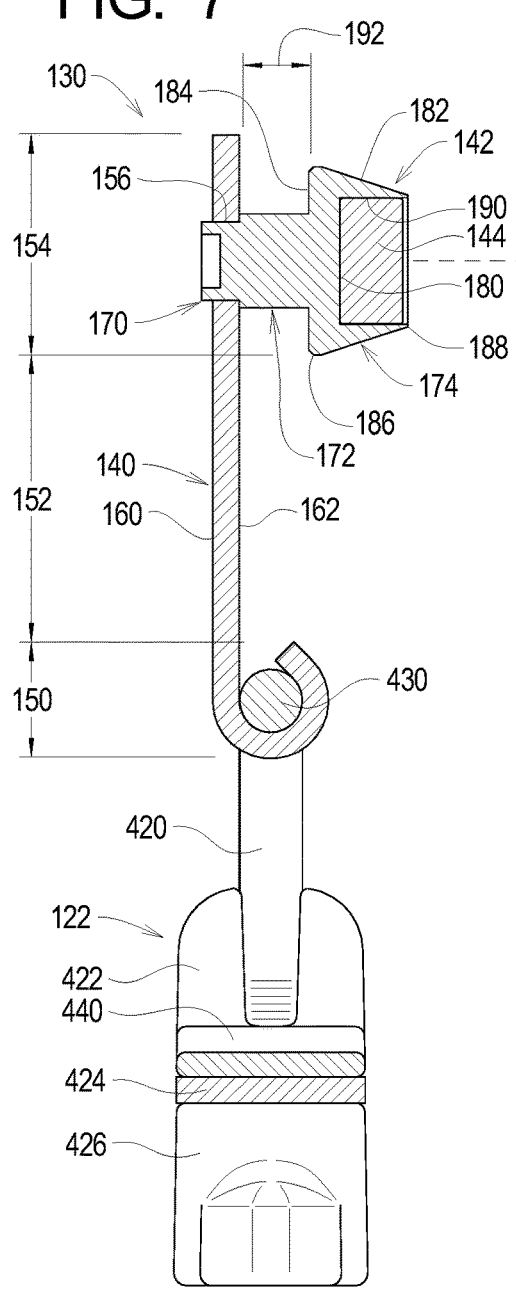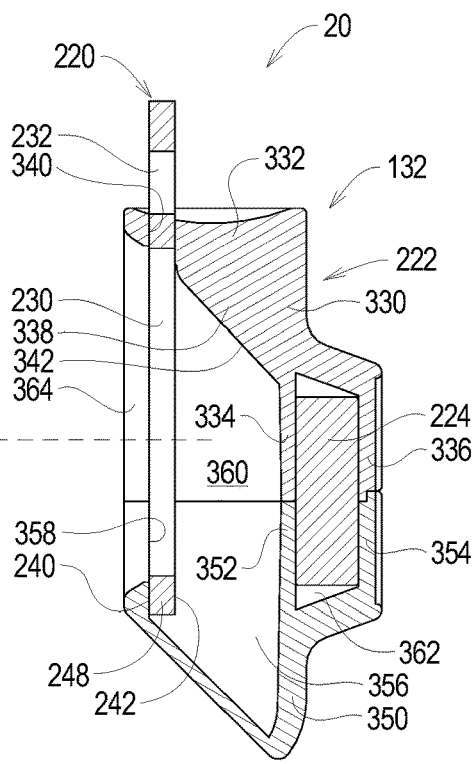

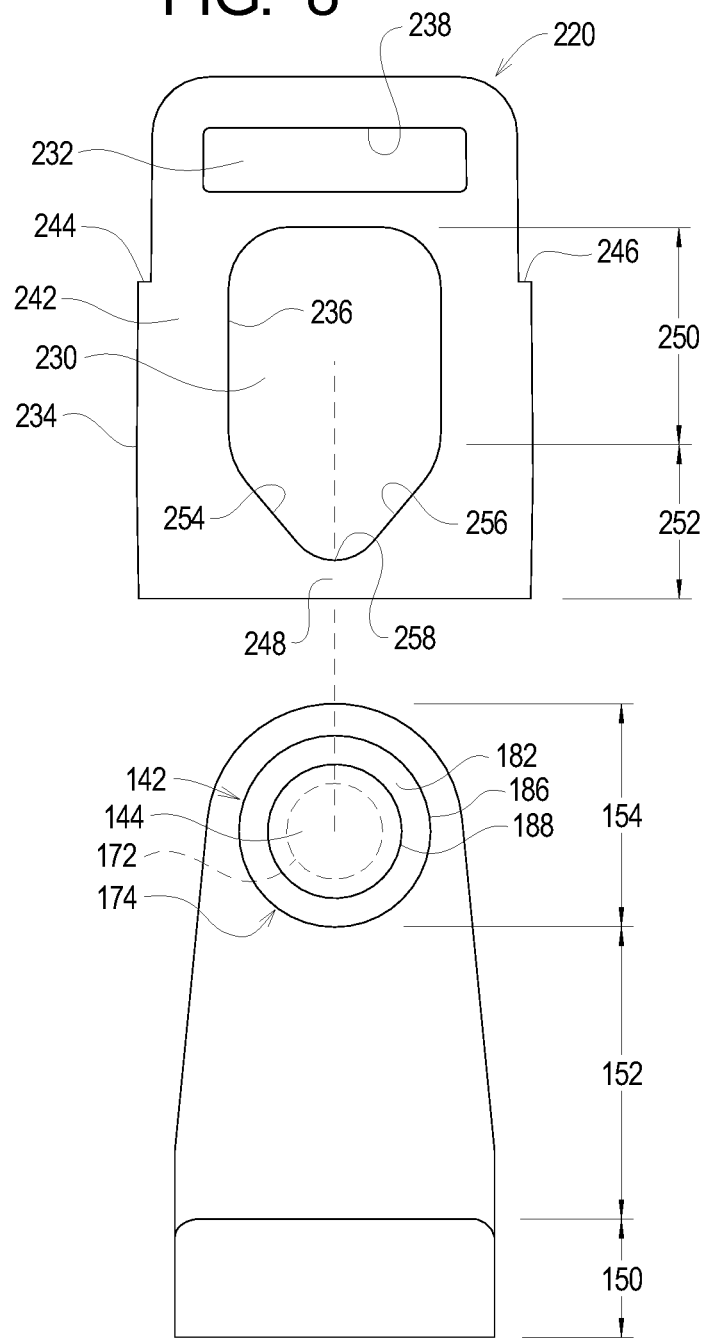

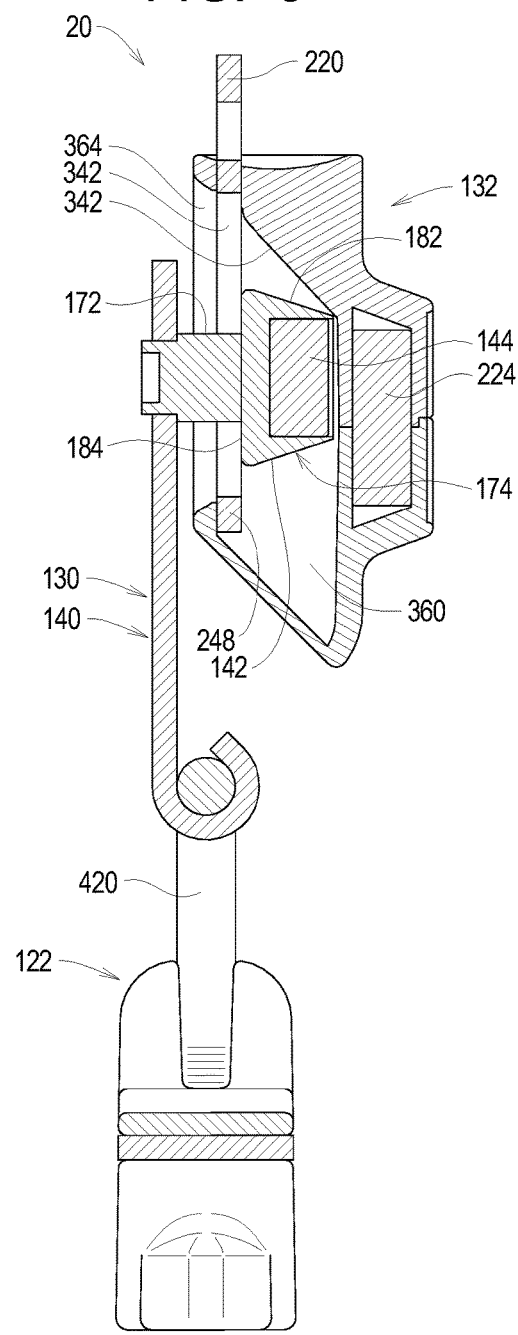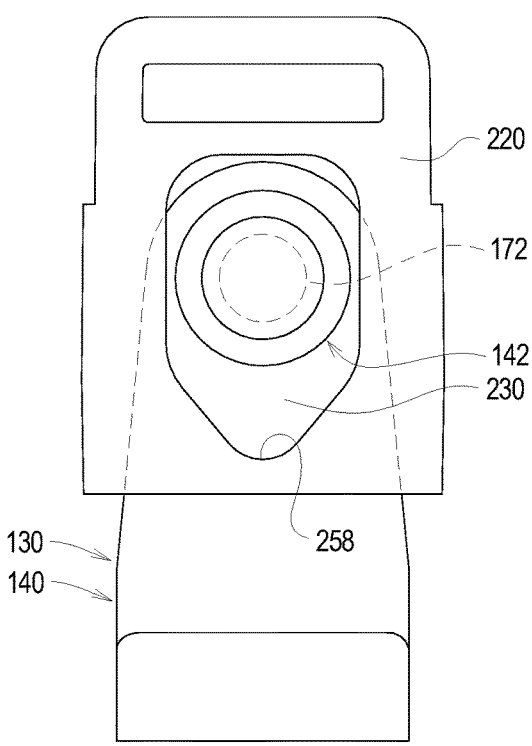

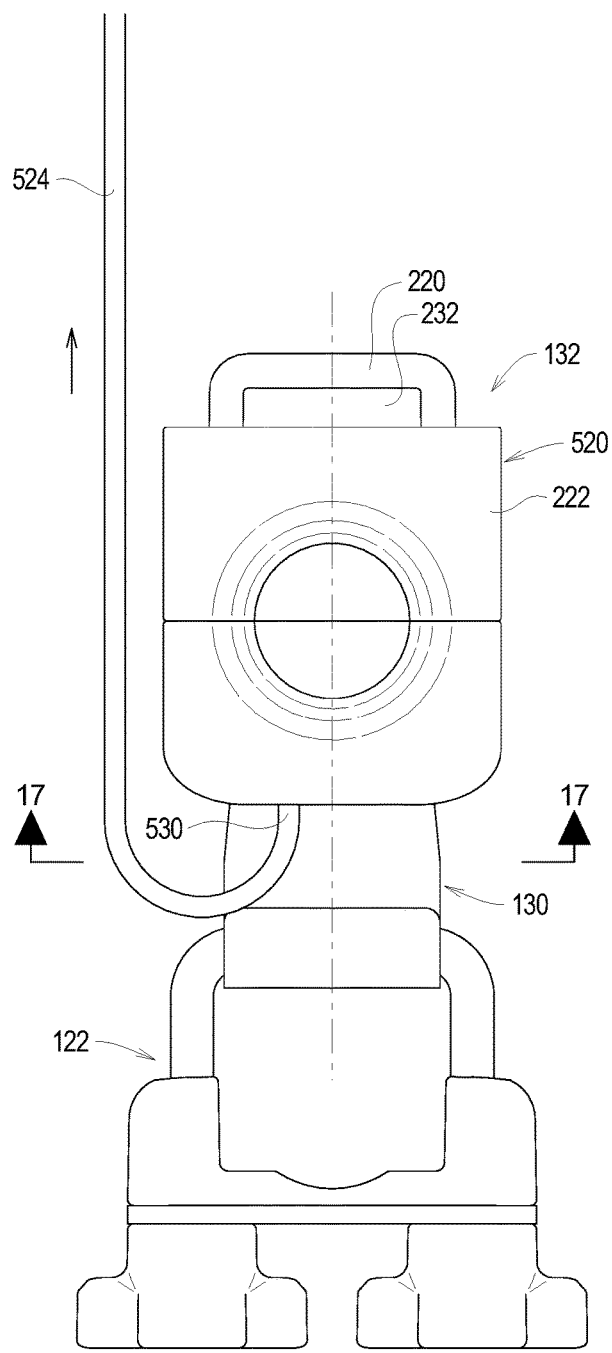
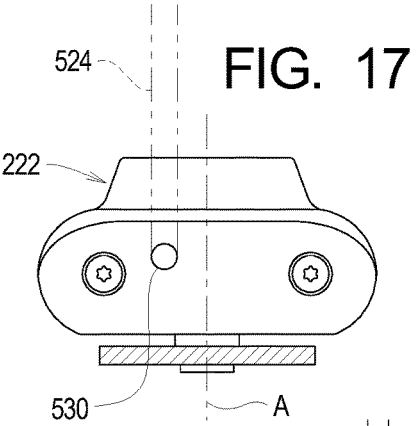
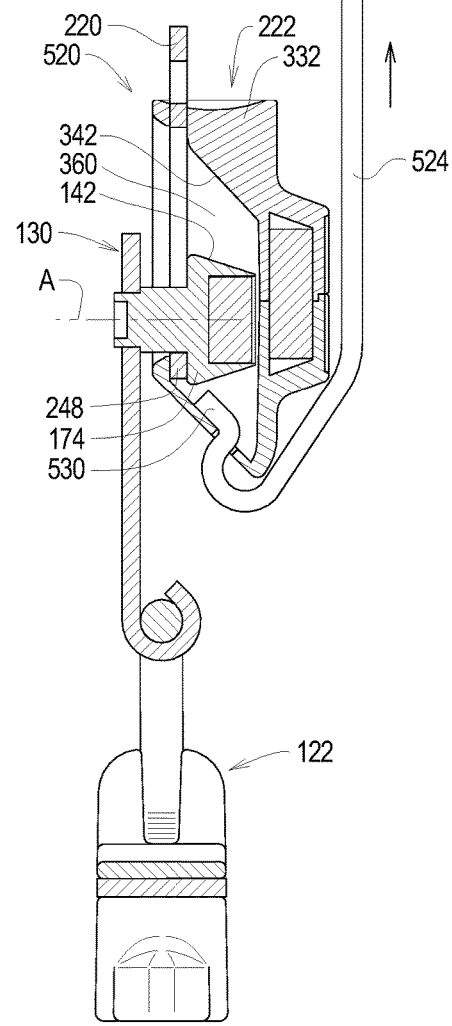
FIG. 16
FIG. 17
FIG. 18

FIG. 20
FIG. 21
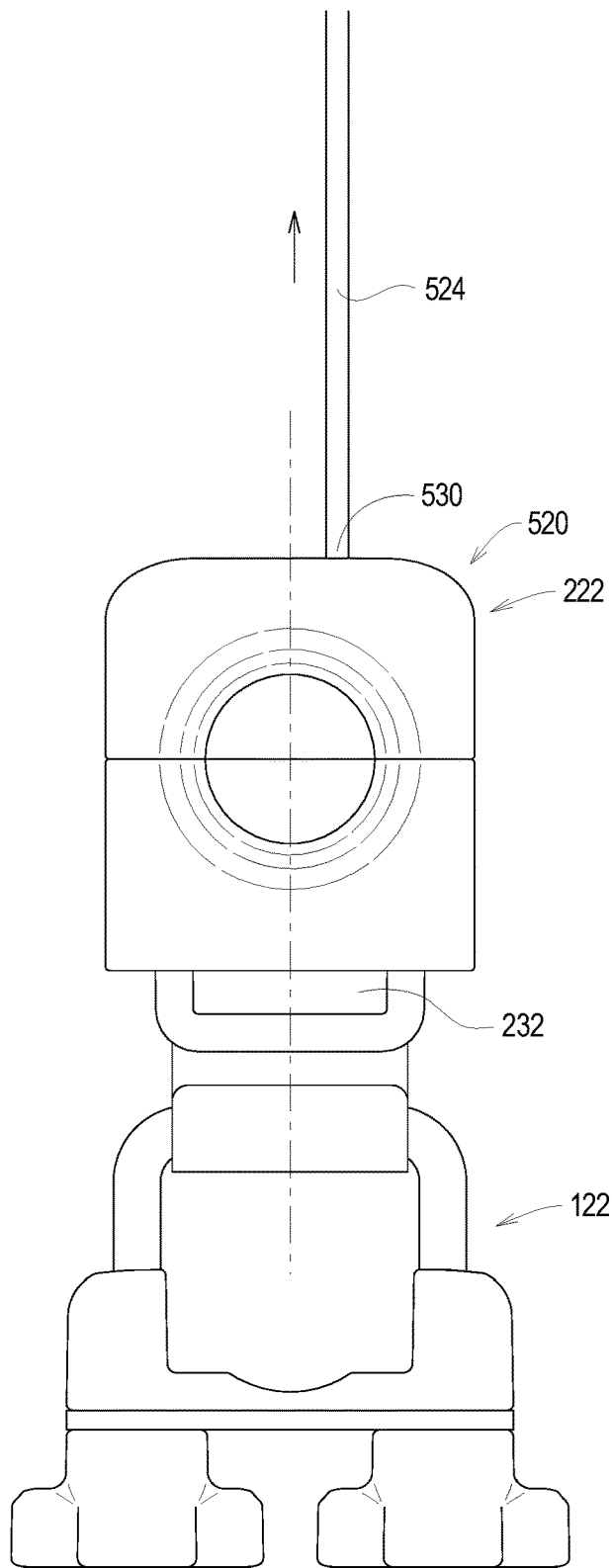
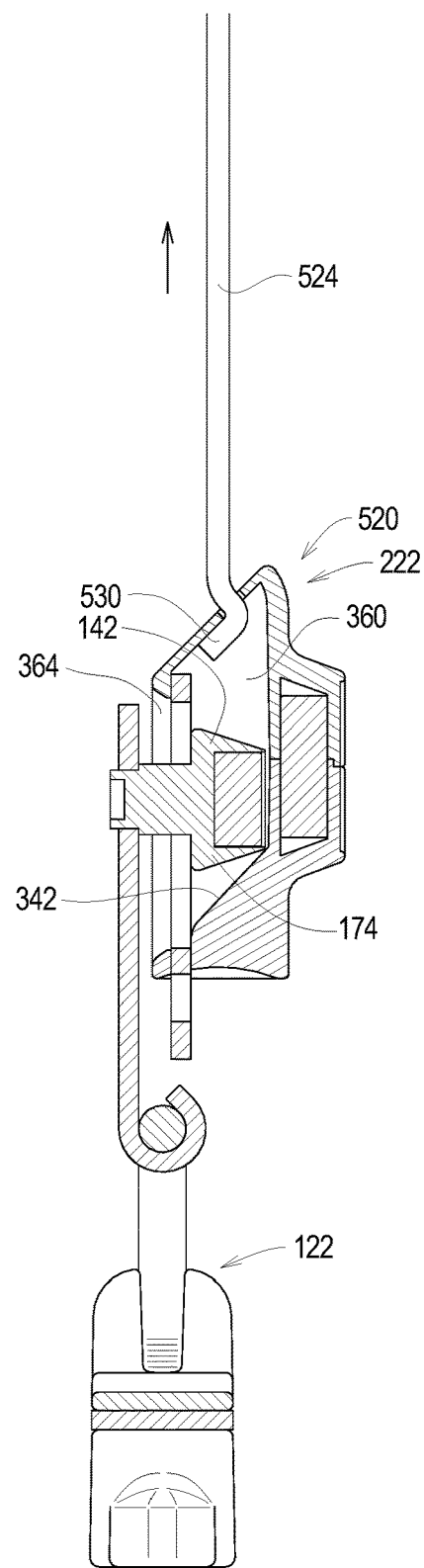

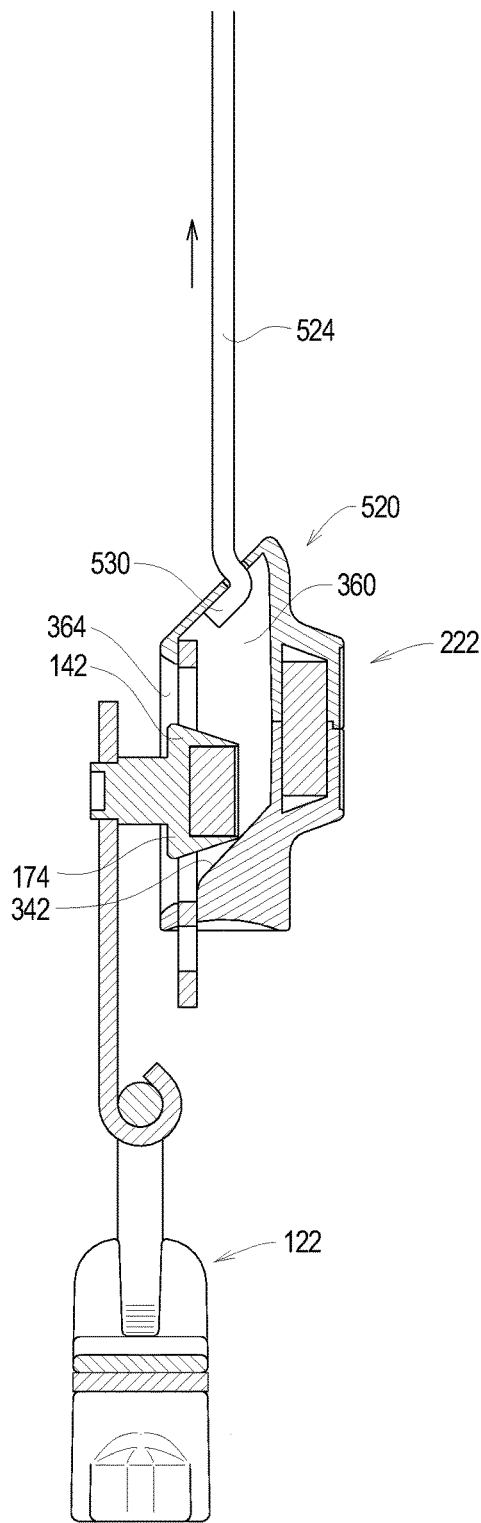
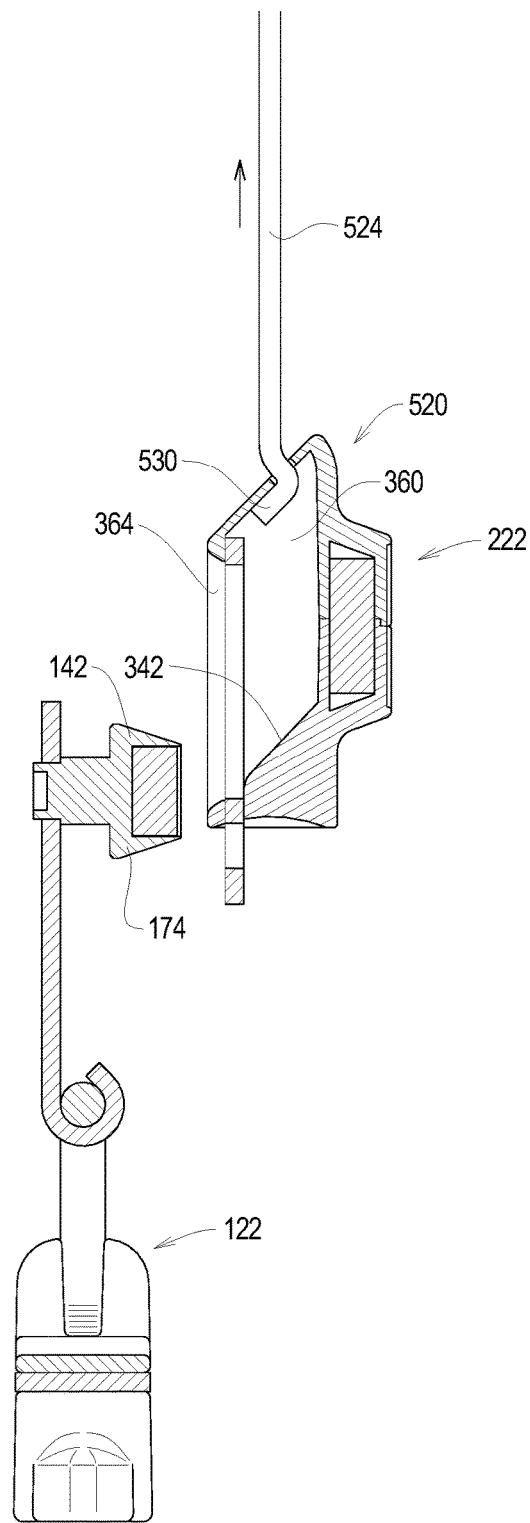
FIG. 22
FIG. 23

LATCH SYSTEMS AND METHODS FOR STRAPS

TECHNICAL FIELD

The present invention relates to latch systems and methods and, more specifically, to latch systems and methods that secure an end of a strap to a structure.

BACKGROUND

Items are commonly secured relative to a structure. For example, an item may be secured to a building to prevent wind or the like from blowing the item away. As another example, an item may be secured to a vehicle to prevent relative air movement from displacing the item relative to the vehicle when the vehicle is moving. The present invention is of particular significance in the context of securing an item to a vehicle, and that example of the present invention will be described herein in detail. However, the latch systems and methods of the present invention may have broader application to other operating environments.

To secure an item to a vehicle, ropes, bungee cords, straps, or the like are often secured at at least two structural locations relative to the vehicle and over or through at least a portion of the item. Often, at least one of the structural locations is difficult to access when the item is in place. For example, if an item such as a watercraft is secured to the roof rack of the vehicle using strap, one end of the strap must be secured relative to the roof rack near the centerline of the vehicle. Passing the strap in either direction over the watercraft when the watercraft is in place requires an awkward reach over the watercraft to the centerline of the vehicle.

The need exists for tie-down systems for items that allow an end of a strap to be quickly and easily secured relative to a structure and further that allow an end of the strap to be secured to a location access to which is difficult or impossible.

SUMMARY

The present invention may be embodied as a latch system comprising a socket assembly and a plug assembly. The socket assembly comprises a socket housing, a socket plate, and a socket magnet. The socket housing defines a primary chamber, a secondary container, and a main opening. The socket plate defining a plug opening and is supported by the socket housing such that plug opening is at least partly aligned with the main opening. The socket magnet member is arranged within the secondary chamber. The plug assembly comprises a plug plate, a plug member, and a plug magnet member. The plug member comprises a head portion and is supported by the plug plate to define a head gap. The plug magnet member is supported by the plug member. When the socket assembly is within a predetermined distance from the plug assembly, the socket magnet member and plug magnet member displace the socket assembly towards the plug assembly. To place the latch system in an engaged configuration, the head portion of the plug member passes through the main opening in the socket housing and the plug opening in the socket plate such that the head portion is within the primary chamber. To place the latch system in a latched configuration, the socket assembly is displaced relative to the plug assembly to arrange at least a portion of the socket plate within the head gap.

The present invention may also be embodied as a method of securing a strap to first and second structures comprising the following steps. A socket assembly is formed by providing a socket housing defining a primary chamber, a secondary container, and a main opening, providing a socket plate defining a plug opening, supporting the socket plate relative to the socket housing such that plug opening is at least partly aligned with the main opening, and arranging a socket magnet member within the secondary chamber. A plug assembly is formed by providing a plug plate, providing a plug member comprising a head portion, supporting the plug member relative to the plug plate to define a head gap, and supporting a plug magnet member relative to the plug member. The strap is secured to the first structure. The plug assembly is secured to the second structure. The strap is secured to the socket assembly. The socket assembly is arranged to within a predetermined distance from the plug assembly. The latch system is placed in an engaged configuration by allowing the socket magnet member and plug magnet member to displace the socket assembly towards the plug assembly such that the head portion of the plug member passes through the main opening in the socket housing and the plug opening in the socket plate such that the head portion is within the primary chamber. The latch system is placed in a latched configuration by displacing the socket assembly relative to the plug assembly to arrange at least a portion of the socket plate within the head gap.

The present invention may be embodied as a strap assembly comprising a latch system, a strap, and an anchor assembly. The latch system comprises a socket assembly and a plug assembly. The socket assembly comprises a socket housing defining a primary chamber, a secondary container, and a main opening, a socket plate defining a plug opening, where the socket plate is supported by the socket housing such that plug opening is at least partly aligned with the main opening, and a socket magnet member arranged within the secondary chamber. The plug assembly comprises a plug plate, a plug member comprising a head portion, where the plug member is supported by the plug plate to define a head gap, and a plug magnet member supported relative to the plug member. The strap is operatively connected to the socket plate. The anchor assembly is operatively connected to the plug plate. When the socket assembly is within a predetermined distance from the plug assembly, the socket magnet member and plug magnet member displace the socket assembly towards the plug assembly. To place the latch system in an engaged configuration, the head portion of the plug member passes through the main opening in the socket housing and the plug opening in the socket plate such that the head portion is within the primary chamber. To place the latch system in a latched configuration, the strap is tensioned such that the socket assembly is displaced relative to the plug assembly to arrange at least a portion of the socket plate within the head gap.

BRIEF DESCRIPTION OF THE DRAWINGS

FIG. 6 is a bottom plan view of a portion of an example anchor assembly of the first example latch system;

FIG. 7 is a side elevation, section view of the first example latch system in a unlatched configuration;

FIG. 8 is a front elevation view of an example socket plate and an example plug assembly of the first example latch system in the unlatched configuration;

FIG. 9 is a side elevation, section view of the first example latch system in a engaged configuration;

FIG. 10 is a front elevation view of the socket plate and the example plug assembly of the first example latch system in the engaged configuration;

FIG. 16 is a front elevation view of the second example latch system in a latched configuration;

FIG. 17 is a section view taken along lines 17-17 in FIG. 16;

FIG. 18 is a side elevation, section view of the second example latch system in the latched configuration;

FIG. 20 is a front elevation view of the second example latch system during the process of reconfiguring the second example latch system from the latched configuration to the unlatched configuration;

FIG. 21 is a side elevation, section view of the second example latch system during the process of reconfiguring the second example latch system from the latched configuration to the unlatched configuration;

FIG. 22 is a side elevation, section view of the second example latch system during the process of reconfiguring the second example latch system from the latched configuration to the unlatched configuration;

FIG. 23 is a side elevation, section view of the second example latch system during the process of reconfiguring the second example latch system in the unlatched configuration.

DETAILED DESCRIPTION

Figure 1:
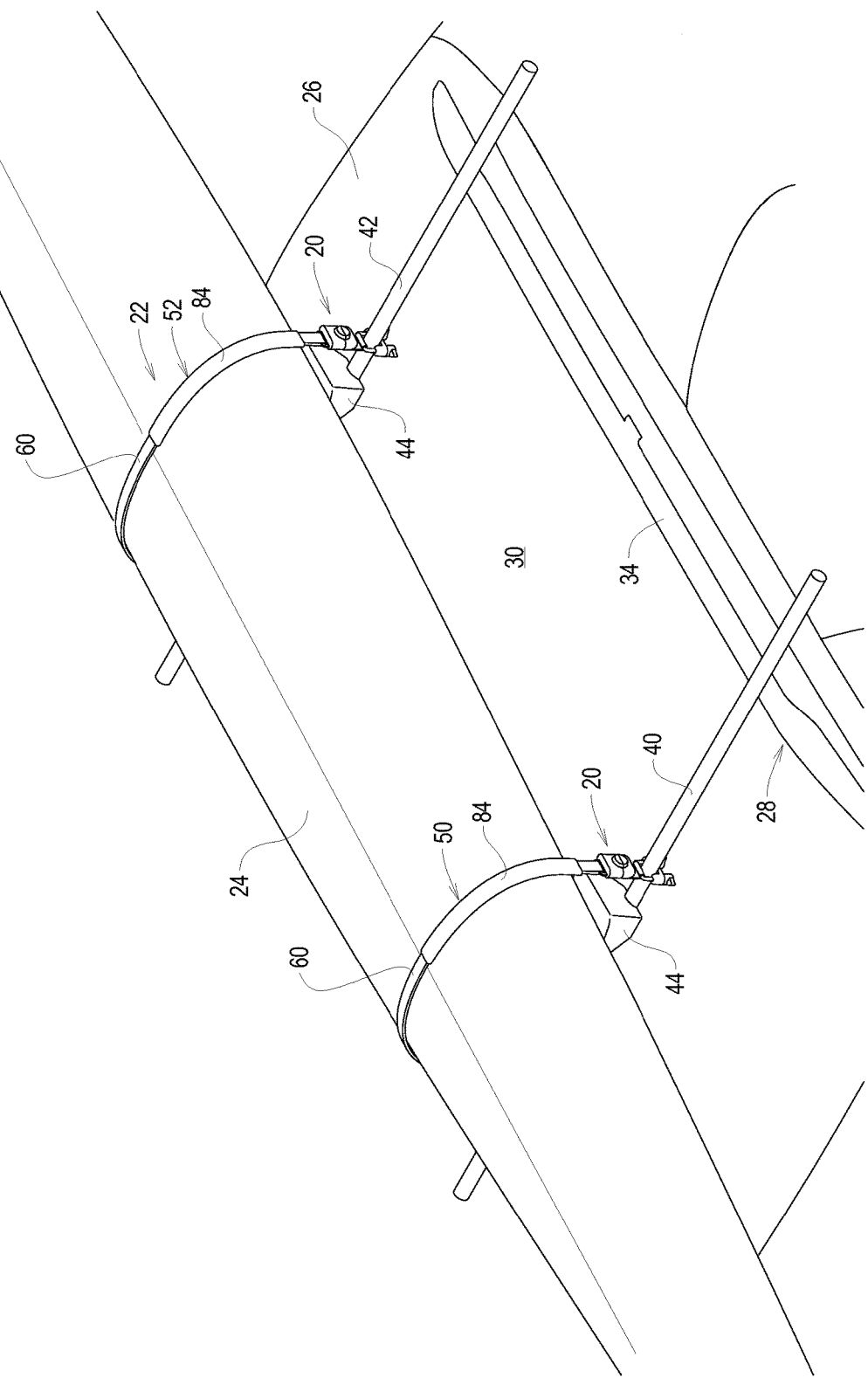
FIG. 1 is a perspective view of first example latch systems being used to secure a watercraft to a vehicle.
Figure 2:
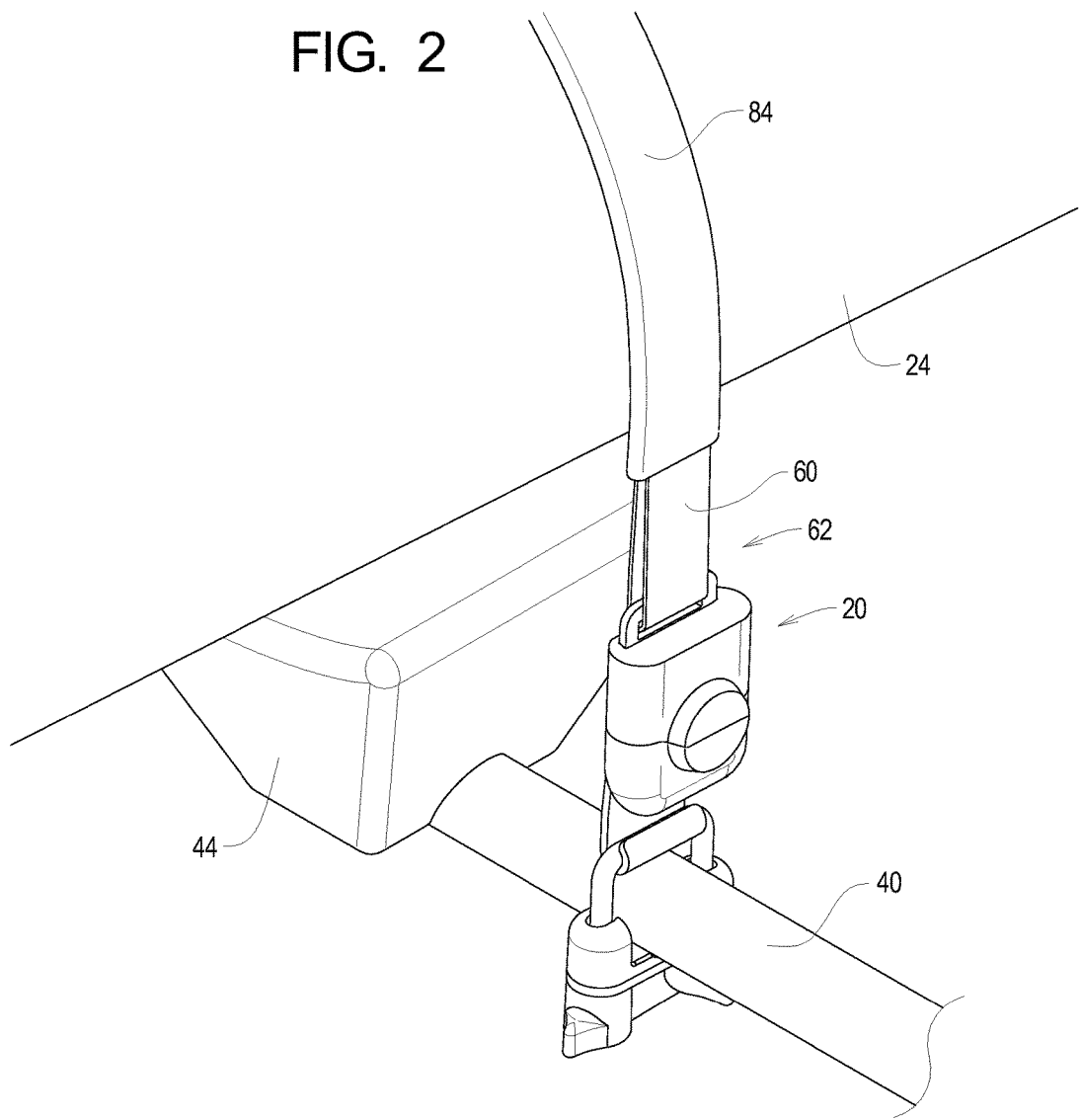
FIG. 2 is a perspective view of the first end of a first example strap system incorporating the first example latch system.
Figure 3:
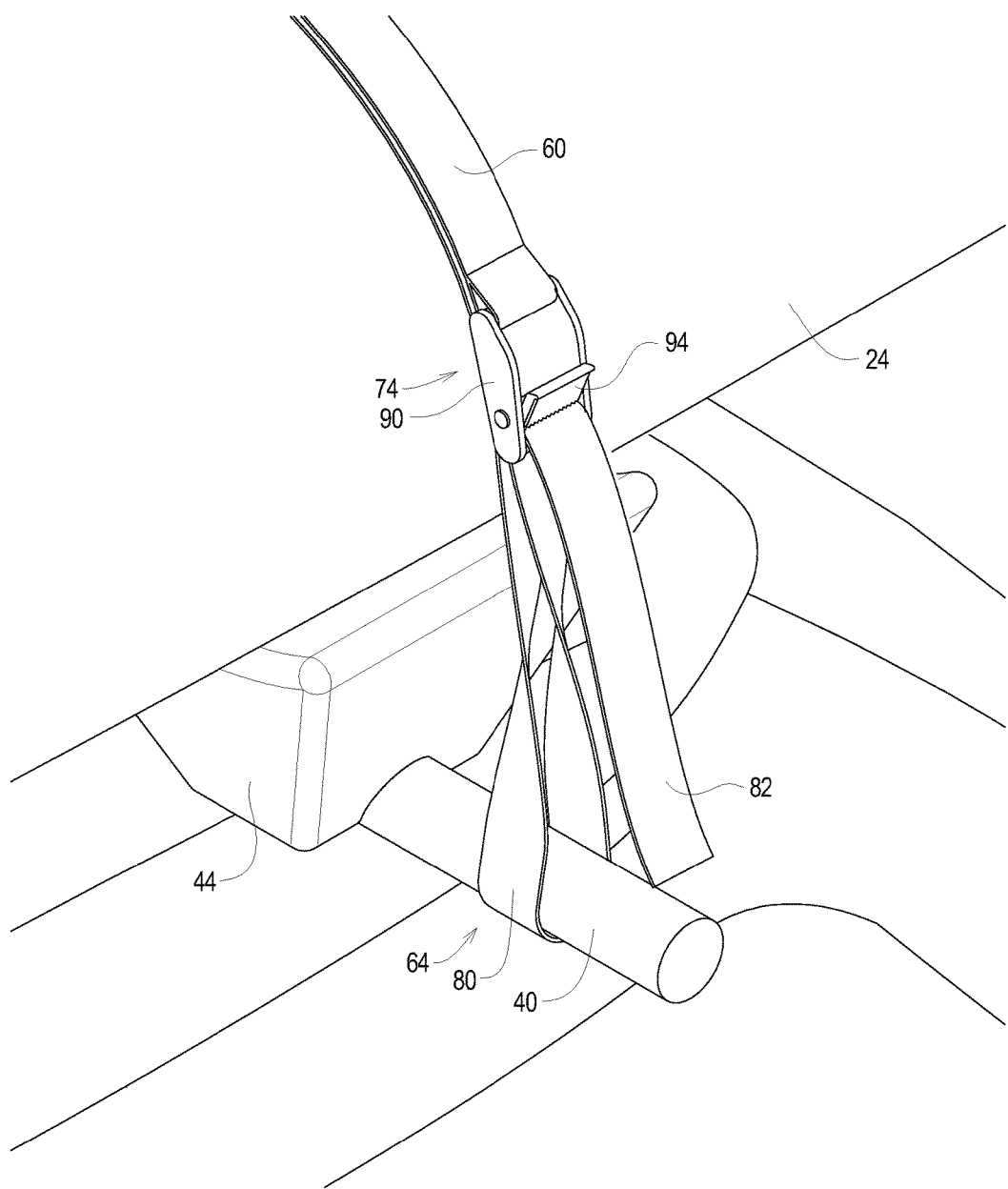
FIG. 3 is a perspective view of a second end of the first example strap system.
Figure 13:
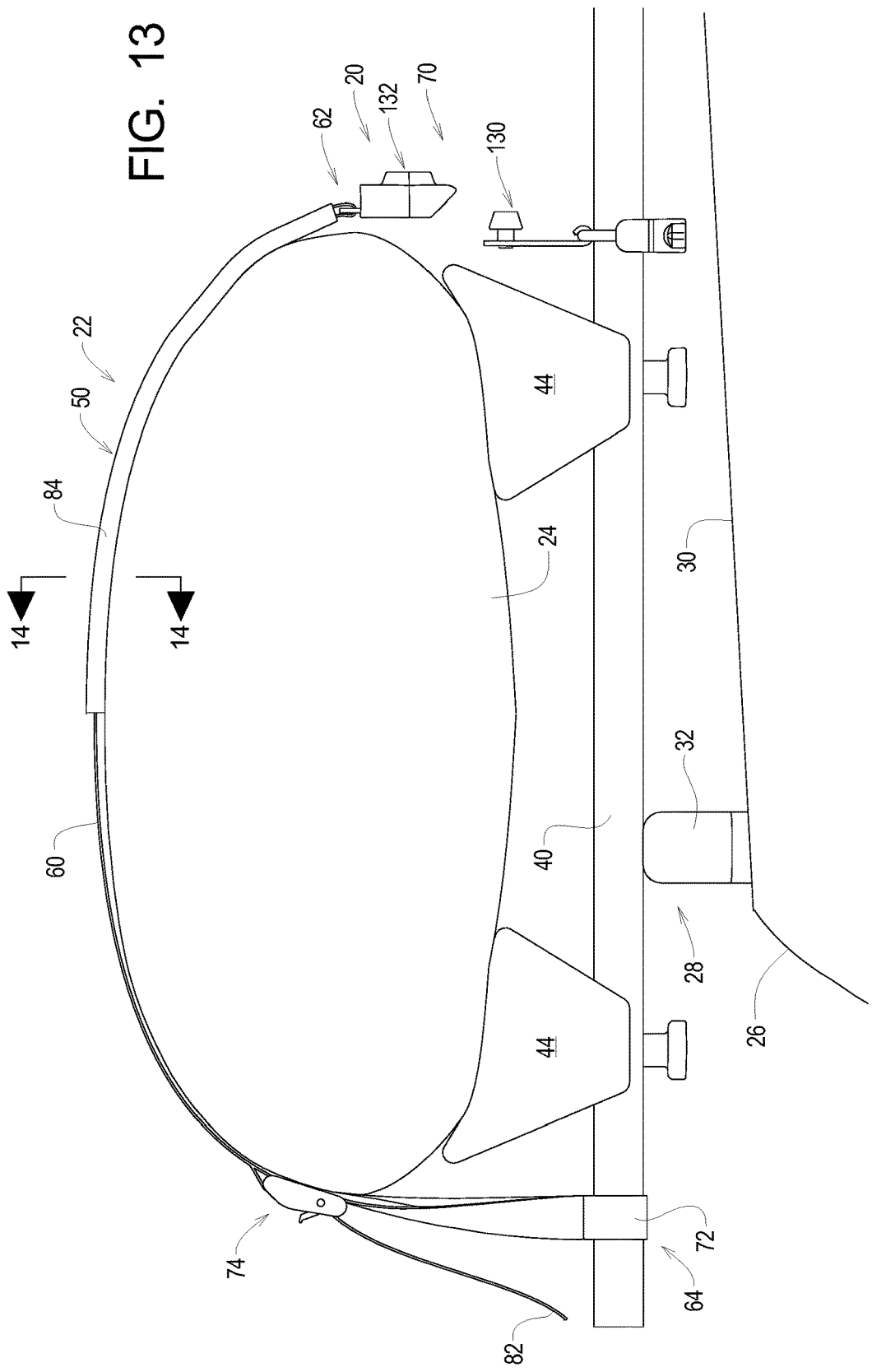
FIG. 13 is a somewhat schematic rear elevation view of the first example latch system being used as part of the first example strap system to secure the watercraft to the vehicle, the first example latch system being shown in the unlatched configuration.

Referring initially to FIGS. 1 and 13 of the drawing, depicted therein is a first example latch system 20 constructed in accordance with, and embodying, the principles of the present invention. FIGS. 1 and 13 illustrate that two of the first example latch systems 20 being used as part of an example tie-down system 22 to secure an item such as a watercraft 24 to structure such as a vehicle 26. In the example in which the item is the watercraft 24 and the structure is the vehicle 26, the first example latch system 20 and the first example strap assembly 22 are used as part of a roof rack system 28.

The first example latch system 20 may be used to secure other items to other structures, and the watercraft 24, vehicle 26, and roof rack system 28 are described herein by way of example only. In that context, the example watercraft 24, the vehicle 26, and the roof rack system 28 are or may be conventional and will be described herein only to that extent helpful to a complete understanding of the construction and operation of the first example latch system 20.

FIGS. 1 and 13 illustrate that the example vehicle comprises a roof 30 on which are mounted first and second rails 32 and 34. The example roof rack system 28 comprises first and second cross bars 40 and 42 and a plurality of saddles 44. The first and second cross bars 40 and 42 are each secured to the first and second rails 32 and 34 such that the first and second cross bars 40 and 42 are substantially parallel to each other and substantially orthogonal to the first and second rails 32 and 34. Two of the saddles 44 are secured to each of the first and second cross bars 40 and 42 to support the watercraft 24 such that the longitudinal axis of the watercraft 24 is substantially orthogonal to the first and second cross bars 40 and 42 and substantially parallel to the first and second rails 32 and 34.

FIG. 1 illustrates that the example tie-down system 22 comprises first and second strap systems 50 and 52. In the example tie-down system 22, the first and second strap systems 50 and 52 are or may be the same, and only the first example strap system 50 will be described herein in detail with the understanding that the discussion of the first example strap system 50 also applies to the second example strap system 52.

As perhaps best shown in FIG. 13, the example first strap system 50 comprises one or more straps 60 configured to define a first end 62 and a second end 64. The example first end 62 defines or is connected to a first connector system 70, while the example second end 64 defines or is connected to a second connector system 72. A tensioner system 74 is configured to allow an effective length of the example first strap system 50 (e.g., between the first end 62 and the second end 64 of the strap 50) to be increased and/or decreased and to apply tension to the first example strap system 50 as will be described in further detail below.

In the first example strap system 50, the example first connector system 70 is formed by the first example latch system 20 of the present invention. As perhaps best shown in FIG. 3, the example second connector system 72 is formed by a loop 80 of strap material 60 forming the one or more straps 60. In particular, FIGS. 2, 3, 13, and 14 illustrate that the example first strap system 50 comprises a single strap 60 secured by a sewn loop at one end to the buckle system 90, passed through a slot formed by the first connector system 70, fed back through the tensioner system 74 in a first direction, formed into the loop 80 to define the example second connector system 72, and then fed back through the tensioner system 74 to define a strap free end 82. Alternatively, the example second connector system 72 may be formed by the first example latch system 20 of the present invention.

Figure 14:
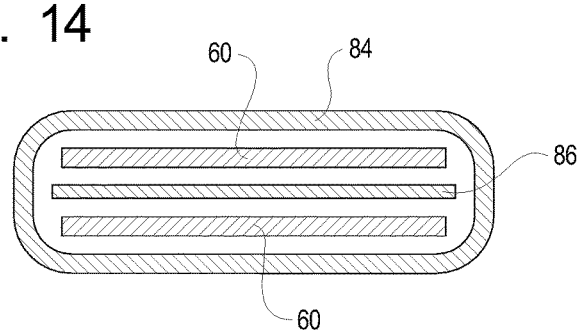
FIG. 14 is a section view taken along lines 14-14 in FIG. 13.

FIGS. 13 and 14 further illustrate that a jacket 84 may be provided to hold the two overlapping portions of the strap 60 together as they are passed over the top of the watercraft 24. FIG. 14 further illustrates a shaping member 86 arranged between the overlapping portions of the strap 60 within the jacket 84. The example shaping member 62 allows the strap first end 62 to be configured such that the socket assembly 132 is more likely to extend to a position adjacent to the plug assembly 130 when in the configuration shown in FIG. 13.

The example tensioner system 74 is or may be conventional. In the first example strap system 50, the example tensioner system 74 is formed by a buckle system 90 that allows the free end 82 of the strap or straps 60 to be pulled to shorten the effective length of the first example strap assembly 50 and thereby apply tension to the first example strap assembly 50 when the first and second connector systems 70 and 72 are secured to structural members as described in further detail below. The example tensioner system 74 further comprises a ratchet release 94 to allow the effective length of the first example strap assembly 50 to be lengthened, held under tension when the first and second connector systems 70 and 72 are secured to the respective structural members, and subsequently released to allow the strap assembly 50 to be lengthened. The example buckle system 90 is or may be conventional and may include a cam member that is rotated to increase friction between the buckle system 90 and the strap 60. Additionally, the example buckle system 90 can also comprise a releasable pawl configured to mechanically engage the strap 60 to secure the strap 60 relative to the buckle system 90.

Figure 4:
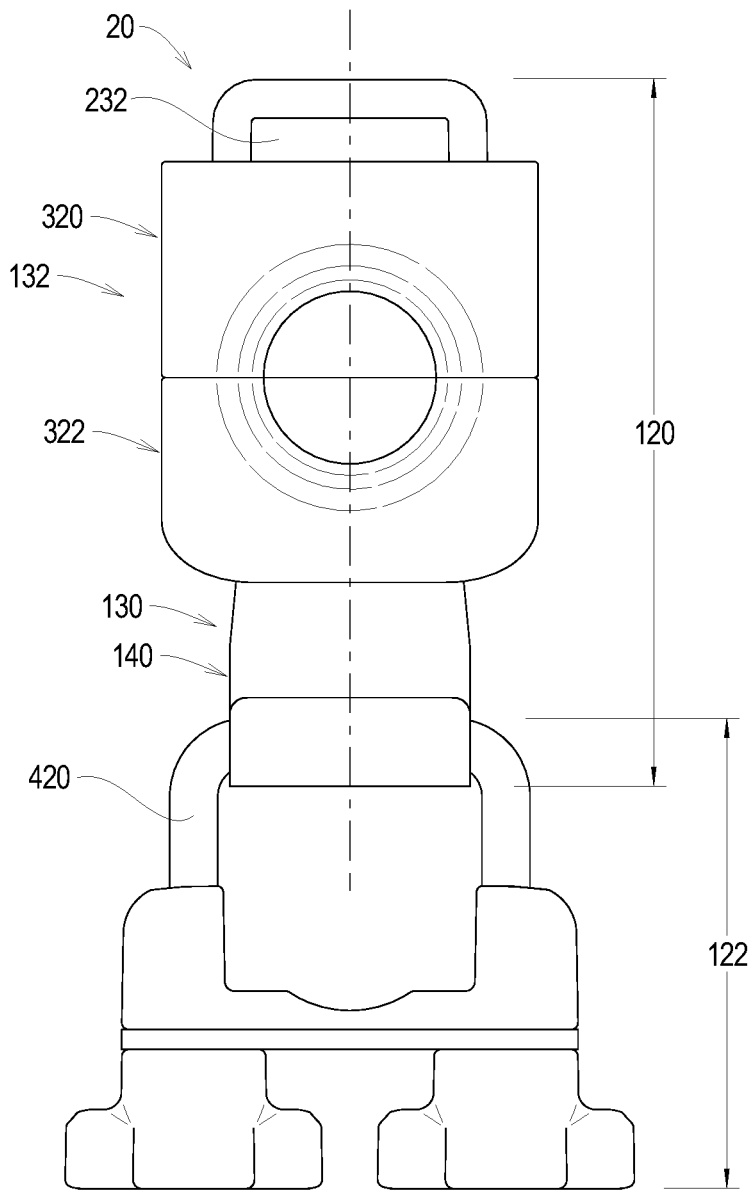
FIG. 4 is a front elevation view of the first example latch system.

Turning now to FIGS. 1, 2, and 4-14 of the drawing, the construction and use of the first example latch system 20 will now be described in further detail. FIG. 4 illustrates that the first example latch system 20 comprises a clasp system 120 and an anchor system 122.

Figure 5:
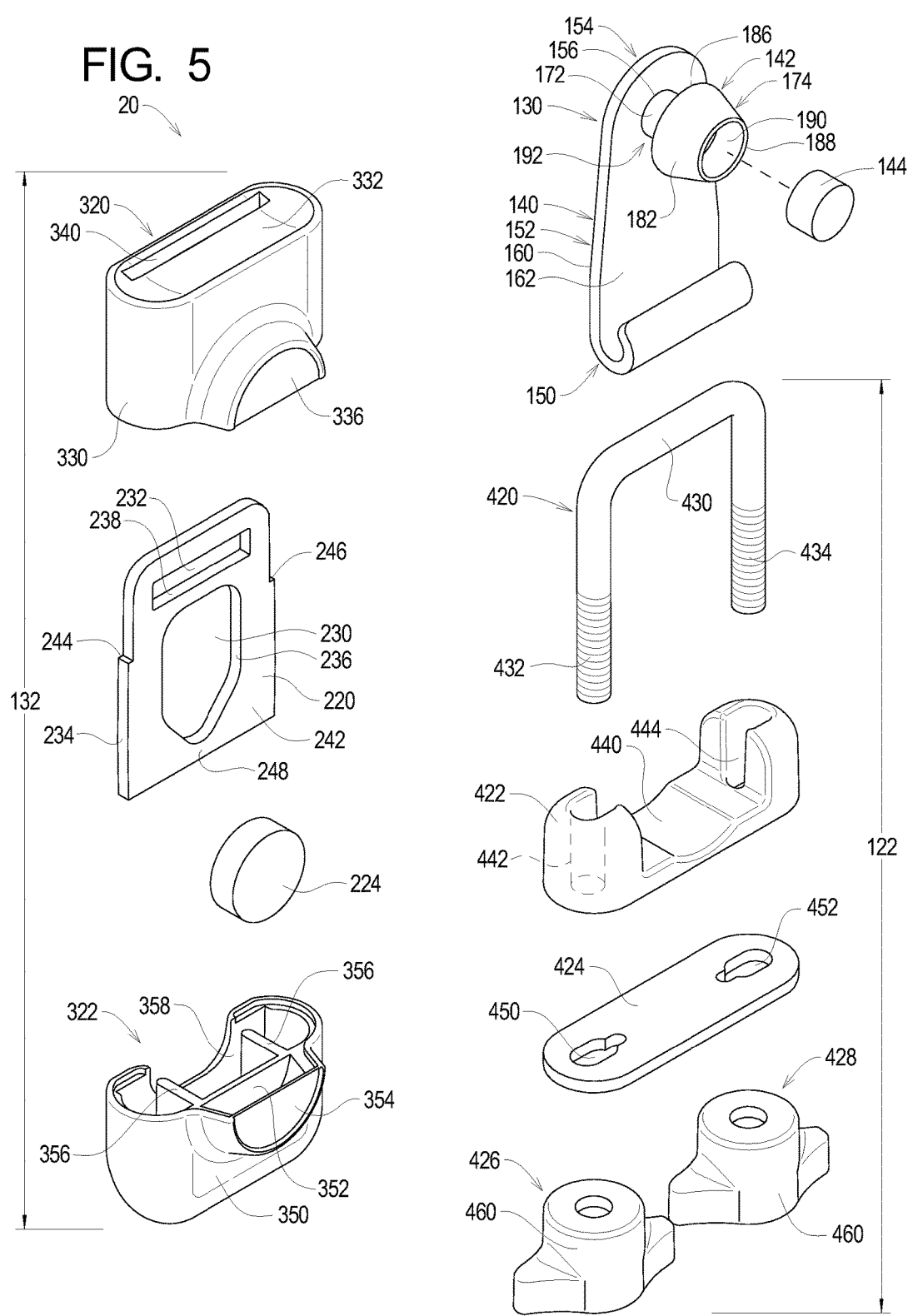
FIG. 5 is an exploded view of the first example latch system.

As perhaps best shown in FIGS. 5 and 7, the example clasp system 120 comprises a plug assembly 130 and a socket assembly 130. The example plug assembly 130 is adapted to be secured to the anchor system 122, while the example socket assembly 132 is adapted to be secured to the first end 62 of the strap 60. Further, the plug and socket clasp assemblies 130 and 132 are configured to be detachably attached to each other.

FIGS. 5 and 7 illustrate that the example plug assembly 130 comprises a plug plate 140, a plug member 142, and a plug magnet member 144. The example plug plate 140 comprises a plug plate base portion 152, a plug plate extension portion 152, and a plug plate end portion 154. A plug mount 156 is formed in the plug plate end portion 154. The example plug mount 156 takes the form of a hole formed in the plug plate 140. The example plug plate 140 defines a plug plate rear surface 160 and a plug plate front surface 162. The example plug member 142 is a separate member that swaged onto the plug plate 140. The plug member 142 may be integrally formed with the plug plate 140, and systems and methods other than swaging may be used to rigidly connect the plug member 142 to the plug plate 140.

The example plug member 142 defines a mount portion 170, a neck portion 172, and a head portion 174. The example mount portion 170 is sized and dimensioned to be received by the plug mount 156 to rigidly secure the plug member 142 to the plug plate 140. The example neck portion 172 spaces the head portion 174 from the plug plate 140 when the plug member 142 is rigidly secured to the plug plate 140. The example head portion 174 defines an inner surface 180, an outer surface 182, a head rear surface 184, a rear edge 186, and a front edge 188. The inner surface 180 defines a head cavity 190. A head gap 192 is defined between the plug plate front surface 162 and the head rear surface 184.

The example outer surface 182 of the head portion 174 is frustoconical. The example rear edge 186 and the example front edge 188 are defined by planes orthogonally intersecting the conical shape defined by the outer surface 182 and are thus both circular. The diameter of the example outer surface 182 increases in diameter from the rear edge 186 towards the front edge 188 such that the diameter of the front edge 188 is smaller than the diameter of the rear edge 186.

The example plug magnet member 144 is sized and dimensioned to be received within the head cavity 190. In the example plug assembly 130, the front edge 188 of the plug member 142 is rolled over to secure the plug magnet member 144 within the head cavity 190. In addition or instead, an adhesive may be used to secure the plug magnet member 144 within the head cavity 190.

The example button plate base portion 150 is a bent or crimped portion of the button plate 140 to engage the anchor assembly 122 as will be described in further detail below. The example button plate extension portion 152 is sized and dimensioned to space the button member 142 from the button base portion 150 and thus the anchor assembly 122.

FIGS. 5 and 7 also illustrate that the example socket assembly 132 comprises a socket plate 220, a socket housing 222, and a socket magnet member 224. The example socket plate 220 defines a plug opening 230 and a strap opening 232. The example socket plate 220 further defines a perimeter edge 234, a first inner edge 236 extending around the plug opening 230, a second inner edge 238 extending around the strap opening 232. The example socket plate 220 further defines an outer surface 240 and an inner surface 242. The perimeter edge 234 defines a first shoulder surface 244 and a second shoulder surface 246. The example socket plate 220 defines a terminal portion 248. The example plug opening 230 comprises a first portion 250 and a second portion 252. The example first portion 250 is generally rectangular in shape, while the second portion 252 is generally triangular in shape and is defined by first and second angled surface portions 254 and 256 and a terminal surface portion 258 of the first inner edge 236. The terminal portion 248 of the socket plate 220 lies between the terminal surface portion 258 of the first inner edge 236 and the portion of the perimeter edge 324 adjacent thereto.

At least one of the plug magnet member 144 and the socket magnet member 224 is made of magnetic material, and at least one of the plug magnet member 144 and the socket magnet member 224 is made of magnetically attractable material. The example plug magnet member 144 is made of a first magnet, and the example socket magnet member 224 is a second magnet, and the magnetic poles of the first and second magnets are arranged such that the first and second magnets are attracted to each other as will be described in further detail below. As another example, one of the plug magnet member 144 and the socket magnet member 224 may be made of a magnet, and the other of the plug magnet member 144 and the socket magnet member 224 may be made of magnetically attractable material such as steel.

As perhaps best shown in FIG. 5, the example socket housing 222 comprises a first part 320 and a second part 322. The first part 320 defines a first main wall 330, slot wall 332, a first inner wall 334, a first outer wall 336, and at least one rib wall 338. The slot wall 332 defines a slot 340, while the at least one rib wall 338 defines at least one rib wall surface 342. The example second part 322 defines a second main wall 350, a second inner wall 352, a second outer wall 354, and at least one brace wall 356. At least one terminal gap 358 is defined by portions of the second main wall 350 and of the at lone brace wall 356.

The first and second parts 320 and 322 are assembled such that at least a portion of the first main wall 330 engages at least a portion of the second main wall 350, the first inner wall 334 engages the second inner wall 352, and the first outer wall 336 engages the second outer wall 354. So assembled, the socket housing 222 defines a primary chamber 360, a secondary chamber 362, and a housing opening 364.

When the socket assembly 132 is formed, a first portion of the socket plate 220 is arranged within the primary chamber 360, and a second portion of the socket plate 220 extends out of the main chamber 360 through the slot 340 such that the strap opening 232 is arranged outside of the main chamber 360 to allow a portion of the strap 60 to be passed therethrough. The terminal portion 248 of the socket plate 220 is held in the terminal gap 358 between the second main wall 350 and the at least one brace wall 356. The plug opening 230 in the socket plate 220 is at least partly aligned with the housing opening 364 defined by the socket housing 222. The socket magnet member 224 is also arranged within the secondary chamber 362 when the socket assembly 132 is formed.

Referring now again to FIG. 5, the example anchor assembly 122 will be described in further detail. The example anchor assembly 122 is adapted to be secured relative to the structure formed by the crossbars 40 and 42. The details of the example anchor assembly 122 are thus of particular significance in the context of a structural member such as the crossbars 40 and 42, but other anchor assemblies may be used for other structures.

The example anchor assembly 122 comprises a U-bolt 420, a clamp member 422, a clamp plate 424, and first and second nut assemblies 426 and 428. The example U-bolt 420 comprises a central portion 430 and first and second threaded end portions 432 and 434. The example clamp member 422 defines a clamp surface 440 and first and second guide through holes 442 and 444. The example clamp plate 424 defines first and second plate through holes 450 and 452. The example first and second nut assemblies 426 and 428 are the same and each comprise a handle member 460 and a nut 462 (FIG. 6). The nuts 462 are threaded to receive the threaded end portions 432 and 434 of the U-bolt, and the handle members 460 are configured to facilitate tightening of the nuts 462 of the first and second nut assemblies 426 and 428 onto the threaded end portions 432 and 434, respectively.

In use, the first and second threaded end portions 432 and 434 are inserted first through the guide through holes 442 and 444, next through the plate through holes 450 and 452, and then into the nuts 462 of the first and second nut assemblies 432 and 434, respectively. Rotating the handle members 460 to rotate the nuts 462 thus displaces the first and second nut assemblies 432 and 434 against the clamp plate 424 and the clamp member 422 and thus forces the clamp member 422 towards the central portion 430 of the U-bolt 420.

Further, in the example latch system 20, the plug plate base portion 150 is crimped or bent around central portion 430 of the U-bolt 420. The plug plate 140 is thus secured to the U-bolt for limited axial rotation about the longitudinal axis of the U-bolt central portion 430.

With either of the first and second crossbars 40 and 42 arranged between the central portion 430 and the clamp member 422, the anchor assembly 122 will thus clamp the crossbar 40 or 42 between the clamp surface 440 of the clamp member 422 and the base portion 150 of the plug plate 140. At this point, the plug plate 140 is substantially secured relative to the crossbar 40 or 42 to which it is connected.

In use, the first end 62 of the strap 60, to which the example latch system 20 is attached, is slid over the surface of the water craft as shown in FIG. 13 until the socket assembly 132 is in the vicinity of the button assembly 130. At this point, the first example latch system 20 is in its unlatched configuration (see, e.g., FIGS. 7 and 8), but the button magnet 144 and the socket magnet member 224 will be attracted to each other. This attraction will cause the head portion 174 of the socket member 142 to enter the primary chamber 360 through the main opening 364 and eventually through the plug opening 230 in the socket plate 220 such that the first example latch system 20 is in its engaged configuration as shown in FIGS. 9 and 10. The angle of the outer surface 182 of the head portion 174 facilitates passage of the head portion 174 through the main opening 364 and the plug opening 230.

The loop 80 is placed over the crossbar 40 to form the second connector system 72 before the first connector system 70 is formed or after the first connector system 70 has been formed.

Figure 11:
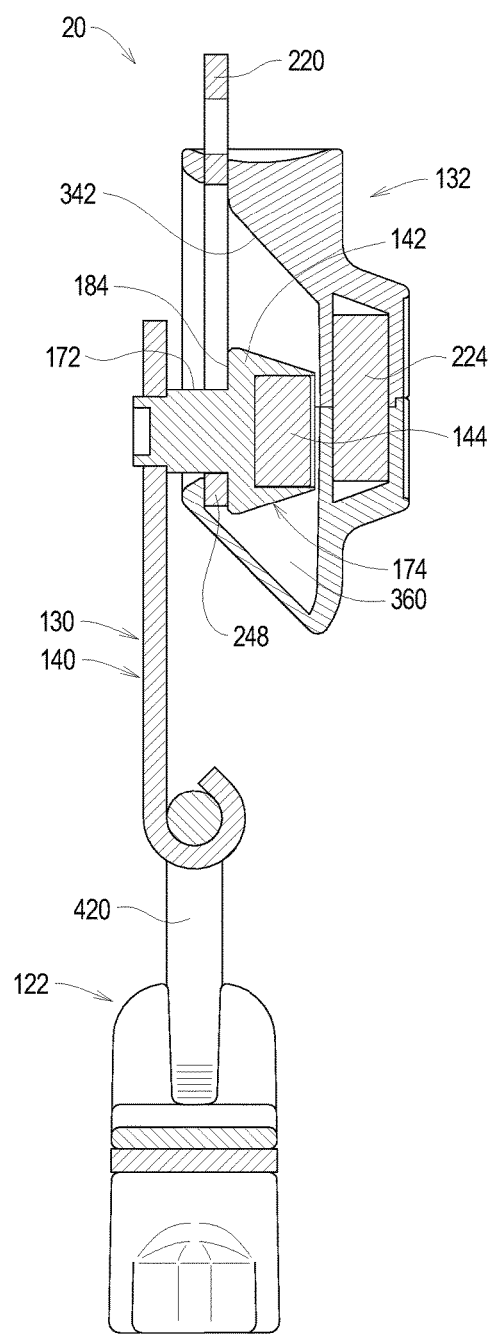
FIG. 11 is a side elevation, section view of the first example latch system in a latched configuration.
Figure 12:
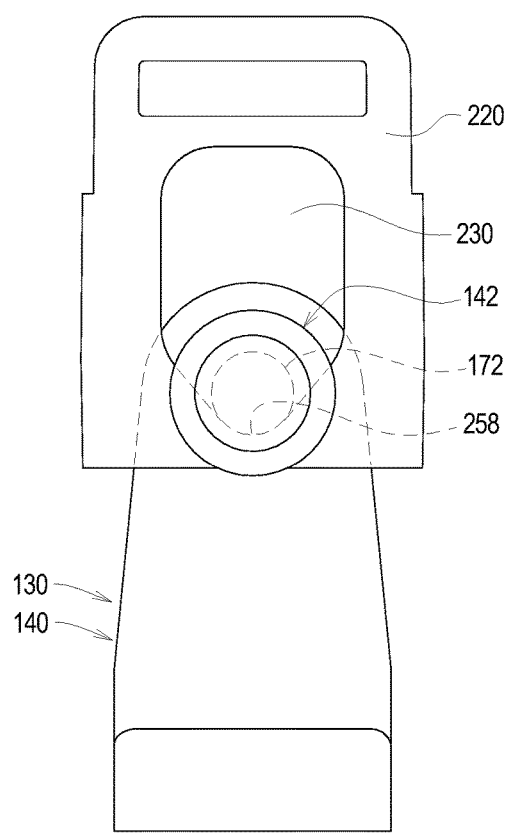
FIG. 12 is a front elevation view of the socket plate and the example plug assembly of the first example latch system in the latched configuration.

Once both the first connector system 70 and second connector system 72 have been formed, the tensioner system 74 is operated to shorten the effective length of the strap 60, displacing the socket assembly 132 relative to the plug assembly 130 away from the anchor assembly 122 into the position shown in FIGS. 11 and 12. At this point, the example first strap assembly 50 is under tension, and the first example latch system 20 is in its latched configuration. When the first example latch system 20 is in the latched configuration, the terminal portion 248 of the socket plate 220 is against rear surface 184 of the head portion 174.

Tension loads on the strap 60 are thus transferred through the socket plate 220, through the neck portion 172 and mount portion 170 of the socket member 142, through the plug plate 140, to the anchor assembly 122, and to the crossbar 40 or 42. The tension on the straps 60 allows the first and second strap assemblies 50 and 52 to securely hold the watercraft 24 against the saddles 44 and thus relative to the vehicle 26.

The attraction of the plug magnet member 144 and socket magnet member 224 allows the first example latch system 20 to be placed into the engaged configuration and eventually the latched configuration without access to the first example latch system 20, even if the user cannot see the first example latch system 20 (e.g., the first example latch system 20 is behind the watercraft 24). Although the first example latch system 20 is of particular significance in situations in which the connector system formed thereby is not accessible or visible, the first example latch system 20 is also very useful in connector system that are easily accessible and/or visible to the user.

To remove the example first strap assembly 50, the ratchet release 94 of the tensioner system 74 is operated to release tension on and thereby introduce slack into the strap 60. The loop 80 may then be removed over the end of the crossbar 40 or 42 to allow the watercraft 24 to be removed.

Before or after the watercraft 24 is removed, the user may twist the socket housing 222 relative to the plug member 142 to detach the plug assembly 130 from the socket assembly 132. In the example depicted in FIGS. 1, 2, and 13, the socket housing 222 is more easily accessible after the watercraft 24 has been removed. The example first strap assembly 50 is then stored until required to secure the watercraft 24 to the vehicle 26.

Turning now to FIGS. 15-23 of the drawing, depicted at 520 therein is second example latch system 520 constructed in accordance with, and embodying, the principles of the present invention. The second example latch system 520 is in most respects the same as the first example latch system 20 described above and will be described herein only to that extent that the second example latch system 520 differs from the first example latch system 20. Reference characters used to identify elements of the first example latch system 20 will be used to refer to similar elements of the second example latch system 520.

The second example latch system 520 forms a part of a strap assembly 522 that is similar to the example first strap assembly 50 described above. The latch system 520 further comprises a cord 524 that is operatively connected to the socket housing 222. The example cord 524 of the example latch system 520 may be used in conjunction with a latch system that does not use magnetic attraction to locate a socket assembly relative to a plug assembly. Although shown free for purposes of clarity in FIG. 15, the example cord 524 can be at least partly arranged within the jacket 84.

In particular, a first end 530 of the cord 524 is secured to the socket housing 222 at a location adjacent to the terminal portion 248 of the socket plate 220. Stated alternatively, the first end 530 is secured to the socket housing 222 at an opposing end of the primary chamber 360 from the end of the primary chamber 360 adjacent to the slot wall 332. In addition, as perhaps best shown in FIG. 17, the example first end 530 of the example cord 524 is offset from an axis of rotation A defined by the button member 142.

Figure 19:
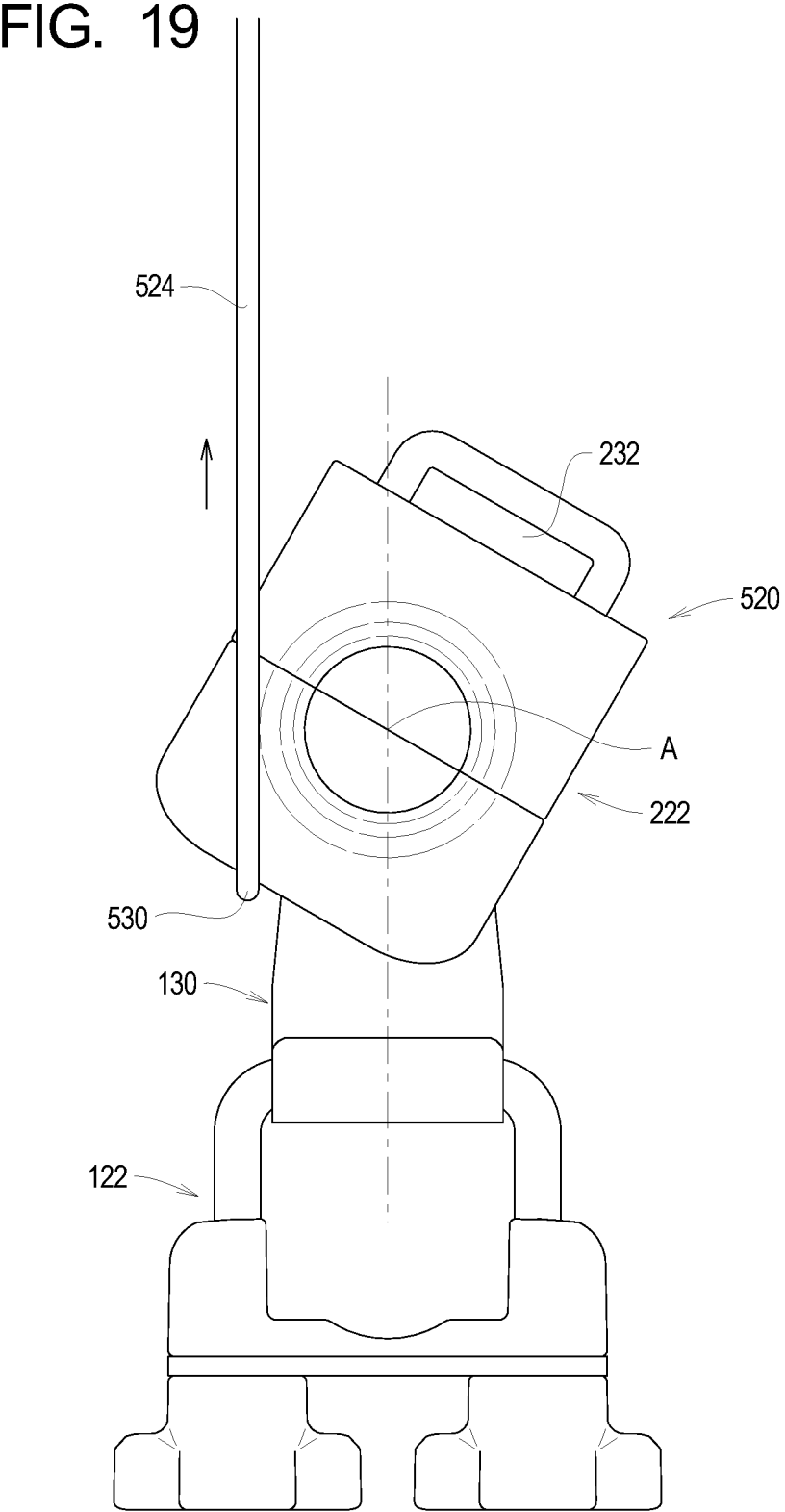
FIG. 19 is a front elevation view of the second example latch system during the process of reconfiguring the second example latch system from the latched configuration to the unlatched configuration.

The cord first end 530 is thus secured to the socket housing 222 such that pulling on a second end 532 of the cord 524 causes the socket housing 222 to rotate relative to the plug assembly 130 about the axis of rotation A defined by the plug member 142, as perhaps best shown in FIG. 19.

As perhaps best shown in FIGS. 20 and 21, eventually the socket housing 222 rotates approximately 180 degrees until the cord first end 530 is opposite the anchor assembly 122 and the strap opening 232 in the socket plate 220 is adjacent to the anchor assembly 122. At this point, tension on the cord 524 will displace the socket assembly 132 relative to the plug assembly 130 away from the anchor assembly 122.

Further tension on the cord 524 will cause the head portion 174 of the plug member 142 to engage the rib wall surface 342. The angle of the rib wall surface 342 is predetermined such that, as the cord 524 is pulled further, the rib wall surface 342 forces the head portion 174 towards main opening 364 in the socket housing 222 (FIG. 22) and eventually out of the primary chamber 360 through the main opening 364 (FIG. 23). At this point, the second example latch system 520 is in its unlatched configuration.

In use, the second end 532 of the cord 524 is arranged adjacent to the second connector system 72 so that the user may quickly rearrange the second example latch system 520 from the latched configuration into the unlatched configuration without direct access to the second example latch system 520.

Figure 15:
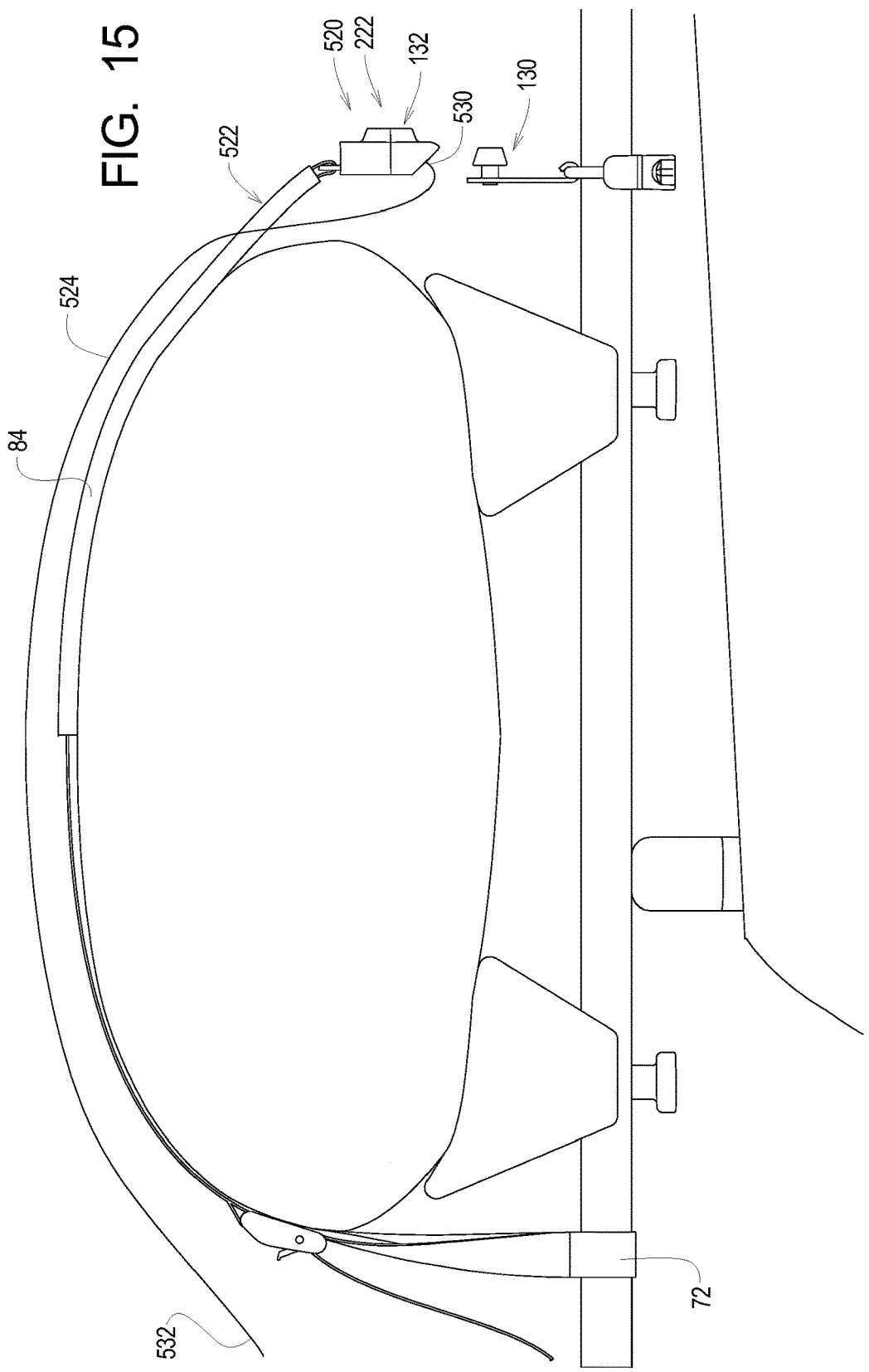
FIG. 15 is a somewhat schematic rear elevation view of a second example latch system being used as part of a second example strap system to secure a watercraft to a vehicle, the second example latch system being shown in an unlatched configuration.

As described above, the example shaping member 62 (not visible in FIG. 15) allows the strap first end 62 to be configured such that the socket assembly 132 is more likely to extend to a position adjacent to the plug assembly 130 when passed over the watercraft 24. A comparison of the situation shown in FIG. 13 with the configuration shown in FIG. 15 illustrates that the shaping member 62 is configured such that the strap first end 62 extends further out in FIG. 15 than in FIG. 13 to accommodate the position of the plug assembly 130.

Figure 24:
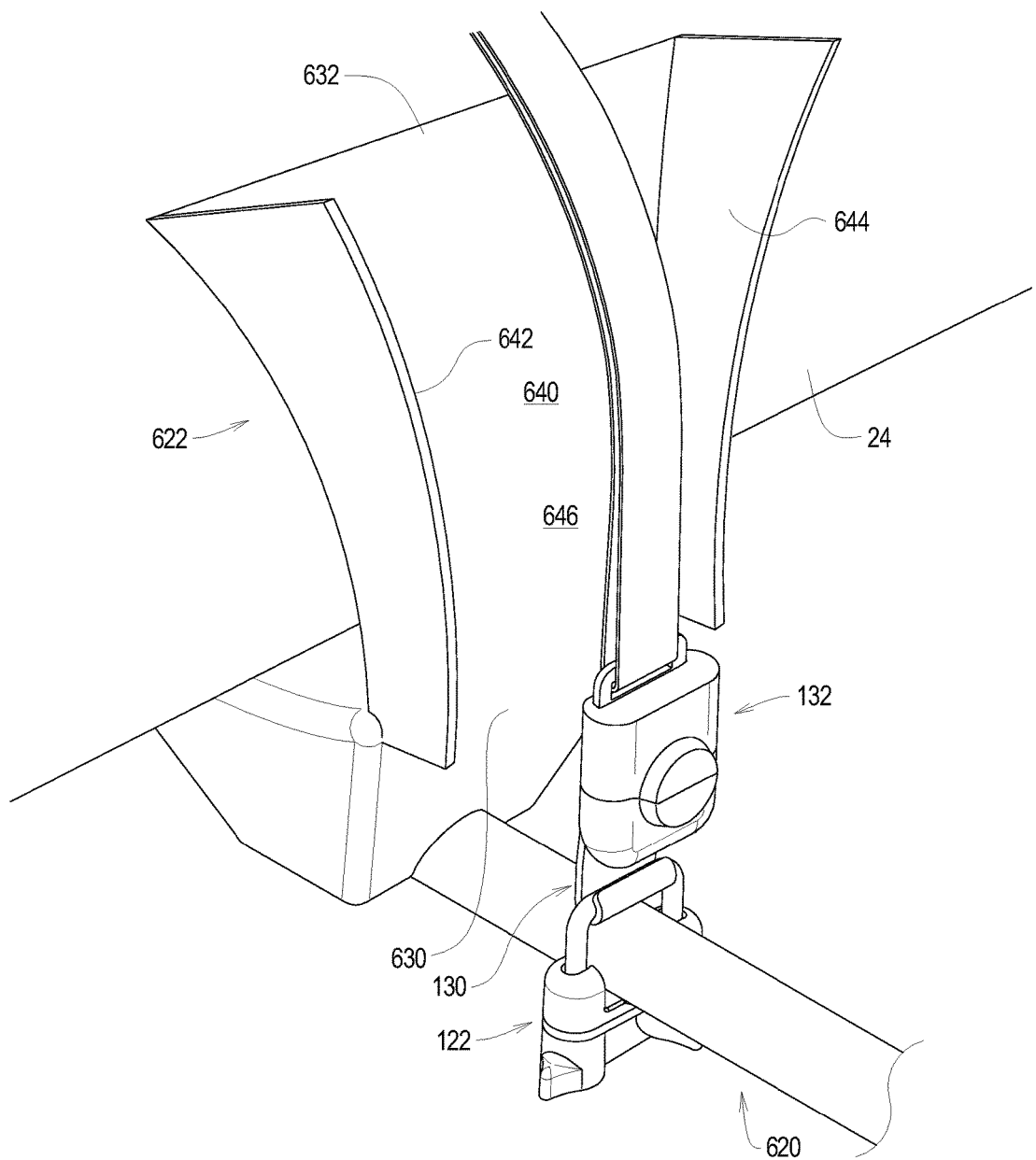
FIG. 24 is a perspective view of the first end of a third example strap system incorporating the first example latch system.

Turning now to FIG. 24 of the drawing, depicted therein is an example roof rack system 620 of the present invention that may be used in conjunction with either of the latch systems 20 or 520 described above. The second example roof rack system 620 is in most respects the same as the example roof rack system 28 described above and will be described herein only to that extent that the second example roof rack system 620 differs from the first example roof rack system 28. Reference characters used to identify elements of the first example roof rack system 28 will be used to refer to similar elements of the second example roof rack system 620.

The second example roof rack system 620 employs a funnel member 622 that is secured relative to the anchor assembly 122 and plug assembly 130 of either of the latch systems 20 or 520. The example funnel member 622 is secured to the saddle 44 but may be secured to the cross bar 40 and/or to the anchor assembly 122.

The example funnel member 622 is generally fan shaped and defines a narrow end 630 and a wide end 632. The narrow end is arranged to "point" to the anchor assembly 122 and/or the plug assembly 130, and the wide end 632 is arranged to extend upwards along the watercraft 24. The example funnel member 622 further defines a slide surface 640 and first and second funnel surfaces 642 and 644 that define a funnel region 646.

When the user slides the socket assembly 132 over the top of the watercraft 24 towards the plug assembly 130 anchored unseen on the other side of the watercraft 24, the magnetic attraction of the plug magnet member 144 and the socket magnet member 224 allows a few inches of error in placement of the socket assembly 132. The funnel member 622 provides a greater margin of error in the placement of the socket assembly 132. The funnel member 622 will guide the socket assembly 132 into closer proximity to the plug assembly 130 to ensure that the magnets 144 and 224 will be close enough to place the example latch systems 20 and 520 into the engaged configurations.

The example roof rack system 620 may be implemented using a latch system that, unlike the example latch systems 20 or 520 described above, does not include a plug magnet member or socket magnet member. In particular, a properly sized, dimensioned, and located funnel member 622 may obviate the need to use magnetic attraction to locate the socket assembly relative to the plug assembly. In that case, the funnel member 622 directs socket assembly to receive the plug assembly and place the latch system in the engaged configuration, and the strap is tensioned to place latch system in the latched configuration. Further, the latch system employed by the example roof rack system 620 may include a cord such as the example cord 524 of the example latch system 520 to allow the latch system of the example roof rack system 620 to be reconfigured from the latched configuration into the unlatched configuration.

What is claimed is:

1. A latch system comprising:
   a socket assembly comprising
      a socket housing defining a primary chamber, a secondary chamber, and a main opening, and
      a socket magnet member arranged within the secondary chamber; and
   a plug assembly comprising
      a head portion defining a head gap, and a plug magnet member supported relative to the head portion; and a cord attached to the socket assembly; whereby when the socket assembly is within a predetermined distance from the plug assembly, the socket magnet member and plug magnet member displace the socket assembly towards the plug assembly;

to place the latch system in an engaged configuration, the head portion of the plug member passes through the main opening in the socket housing such that the head portion is within the primary chamber;

to place the latch system in a latched configuration, the socket assembly is displaced relative to the plug assembly to arrange at least a portion of the socket assembly within the head gap; and to place the latch system in an unlatched configuration, applying tension on the cord when the latch system is in the latched configuration whereby the socket assembly is rotated relative to the plug assembly.

2. A latch system as recited in claim 1, in which the head portion of the plug member defines an outer surface configured to guide the head portion of the plug member through the main opening in the socket housing.

3. A latch system as recited in claim 1, in which the head portion of the plug member defines a frustoconical outer surface.

4. A latch system as recited in claim 1, in which:

the head portion of the plug member defines a head cavity; and the plug magnet member is arranged within the head cavity.

5. A latch system as recited in claim 1, in which the housing defines at least one wall surface disposed at an angle to force the head portion of the plug member out of the primary chamber through the plug opening in the socket plate and the main opening in the socket housing when tension is applied on the cord.

6. A latch system as recited in claim 1, the plug assembly further comprising a plug plate integrally formed with the plug member.

7. A latch system as recited in claim 1, the plug assembly further comprising a plug plate rigidly attached to the plug member.

8. A latch system as recited in claim 1, in which:

the socket assembly further comprises a socket plate defining a plug opening, where the socket plate is supported by the socket housing such that plug opening is at least partly aligned with the main opening; and the plug assembly further comprises a plug plate, and a plug member comprising the head portion; wherein the plug member is supported by the plug plate to define the head gap;

the plug magnet member is supported by the plug member;

to place the latch system in an engaged configuration, the head portion of the plug member passes through the plug opening in the socket plate such that the head portion is within the primary chamber; and to place the latch system in a latched configuration, the socket assembly is displaced relative to the plug assembly to arrange at least a portion of the socket plate within the head gap.

9. A strap assembly comprising:

a latch system comprising a socket assembly comprising a socket housing defining a primary chamber, a secondary chamber, and a main opening, a socket plate defining a plug opening, where the socket plate is supported by the socket housing such that plug opening is at least partly aligned with the main opening, and a socket magnet member arranged within the secondary chamber; and a plug assembly comprising a plug plate, a plug member comprising a head portion, where the plug member is supported by the plug plate to define a head gap, and a plug magnet member supported relative to the plug member;

a strap operatively connected to the socket plate; and an anchor assembly operatively connected to the plug plate; whereby when the socket assembly is within a predetermined distance from the plug assembly, the socket magnet member and plug magnet member displace the socket assembly towards the plug assembly;

to place the latch system in an engaged configuration, the head portion of the plug member passes through the main opening in the socket housing and the plug opening in the socket plate such that the head portion is within the primary chamber;

to place the latch system in a latched configuration, the strap is tensioned such that the socket assembly is displaced relative to the plug assembly to arrange at least a portion of the socket plate within the head gap; and a cord attached to the socket assembly, where applying tension on the cord when the latch system is in the latched configuration rotates the socket assembly relative to the plug assembly to place the latch system in an unlatched configuration.

10. A strap assembly as recited in claim 9, in which the head portion of the plug member defines an outer surface configured to guide the head portion of the plug member through the main opening in the socket housing and the plug opening in the socket plate.

11. A strap assembly as recited in claim 9, in which the head portion of the plug member defines a frustoconical outer surface.

12. A strap assembly as recited in claim 9, in which:

the head portion of the plug member defines a head cavity; and the plug magnet member is arranged within the head cavity.

13. A strap assembly as recited in claim 9, in which the housing defines at least one wall surface disposed at an angle to force the head portion of the plug member out of the primary chamber through the plug opening in the socket plate and the main opening in the socket housing when tension is applied on the cord.

14. A strap assembly as recited in claim 9, further comprising a shaping member to configure the reach of the strap.

15. A strap assembly as recited in claim 14, further comprising a cover arranged to cover at least a portion of the strap and at least a portion of the shaping member.

16. A latch system comprising:

a socket assembly comprising a socket housing defining a primary chamber and a main opening, and a plug assembly comprising a head portion defining a head gap; and a cord operatively connected to one of the socket assembly and the plug assembly; whereby to place the latch system in an engaged configuration, the head portion of the plug member passes through the main opening in the socket housing such that the head portion is within the primary chamber; and to place the latch system in a latched configuration, the socket assembly is displaced relative to the plug assembly to arrange at least a portion of the socket assembly within the head gap; and to place the latch in an unlatched configuration, the cord is placed under tension such that one of the socket assembly and the plug assembly is rotated relative to the other of the socket assembly and the plug assembly.

17. A latch system as recited in claim 16, further comprising:

a socket magnet member arranged within a secondary chamber defined by the socket housing;

a plug magnet member supported relative to the plug assembly; wherein when the socket assembly is within a predetermined distance from the plug assembly, the socket magnet member and plug magnet member displace the socket assembly towards the plug assembly.

18. A latch system as recited in claim 16, in which the socket housing defines at least one wall surface arranged to force the head portion out of the primary chamber through the main opening when one of the socket assembly and the plug assembly is rotated relative to the other of the socket assembly and the plug assembly.

* * * * *